United States Patent

Froehlich et al.

[11] Patent Number: 5,700,012
[45] Date of Patent: Dec. 23, 1997

[54] SEAL INSERT FOR CABLE CONNECTIONS

[75] Inventors: Franz-Fr Froehlich; Wolf Kluwe, both of Hagen; Hans-Juergen Meltsch, Schwerte, all of Germany

[73] Assignee: RXS Kabelgamituren GmbH, Hagen, Germany

[21] Appl. No.: 726,391

[22] Filed: Oct. 4, 1996

[30] Foreign Application Priority Data

Oct. 4, 1995 [DE] Germany ............... 195 36 979.3

[51] Int. Cl.⁶ .................. F16J 15/00; H02G 15/013
[52] U.S. Cl. .................. 277/66; 277/105; 277/123; 277/215; 277/216; 277/DIG. 3; 277/DIG. 8; 277/DIG. 10; 174/93
[58] Field of Search ............... 277/66, 104, 105, 277/123, 215, 216, DIG. 3, DIG. 8, DIG. 10; 174/65 SS, 77 R, 93

[56] References Cited

U.S. PATENT DOCUMENTS

| 324,776 | 8/1885 | Killmer | 277/105 |
|---|---|---|---|
| 807,538 | 12/1905 | Bole | 277/105 |
| 3,848,074 | 11/1974 | Channell | 277/DIG. 10 |
| 4,267,401 | 5/1981 | Wilkinson | 277/123 |
| 4,379,204 | 4/1983 | Perrault et al. | 174/65 SS |
| 4,694,118 | 9/1987 | Schmidt | 174/77 R |
| 4,857,672 | 8/1989 | Rebers et al. | 174/93 |
| 4,988,834 | 1/1991 | Birch | 174/93 |
| 5,235,134 | 8/1993 | Jaycox | 174/93 |
| 5,322,973 | 6/1994 | Dagan | 174/93 |
| 5,510,576 | 4/1996 | Tenace et al. | 174/65 SS |

FOREIGN PATENT DOCUMENTS

| 0 440 903 A1 | 11/1990 | European Pat. Off. |
|---|---|---|
| 2090148 | 8/1970 | France . |
| 2 549 651 | 1/1983 | France . |
| 2 590 347 | 11/1985 | France . |
| 2 593 578 | 1/1986 | France . |
| 2628675 | 12/1977 | Germany ............ 174/93 |
| 1021457 | 11/1964 | United Kingdom . |

*Primary Examiner*—William A. Cuchlinski, Jr.
*Assistant Examiner*—John L. Beres
*Attorney, Agent, or Firm*—Hill, Steadman & Simpson

[57] ABSTRACT

The invention includes a seal insert made of elastic sealing material for the sealing of cable connections. This seal insert is made of several sealing disks which are provided with concentric stampings or grooves and with a radial stamping. For sealing, the cable openings of the sealing disks are fitted by removing concentric rings. For the sealing, the individual sealing disks are arranged reciprocally over one another, whereby the radial slits do not overlap and whereby the concentric grooves engage a smooth underside of an adjacent disk or a smooth surface of the connecting apparatus. A double seal is shown for the introduction of uncut cables.

10 Claims, 4 Drawing Sheets

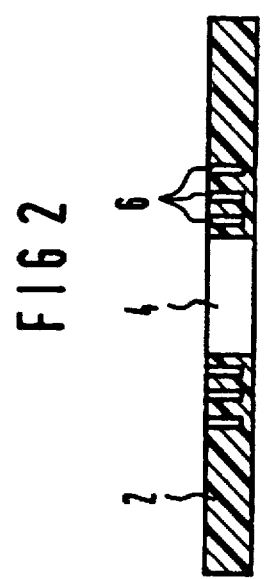
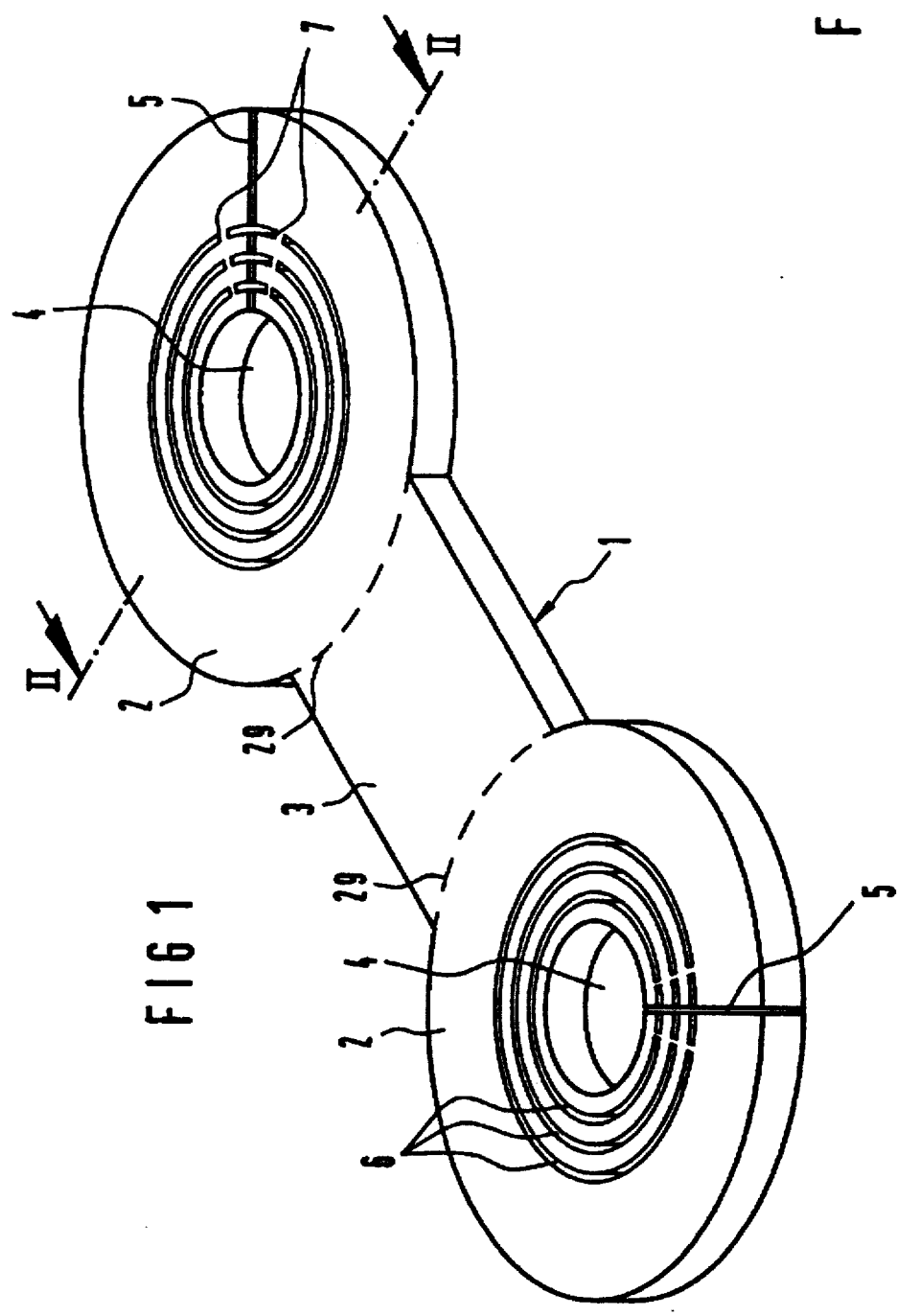

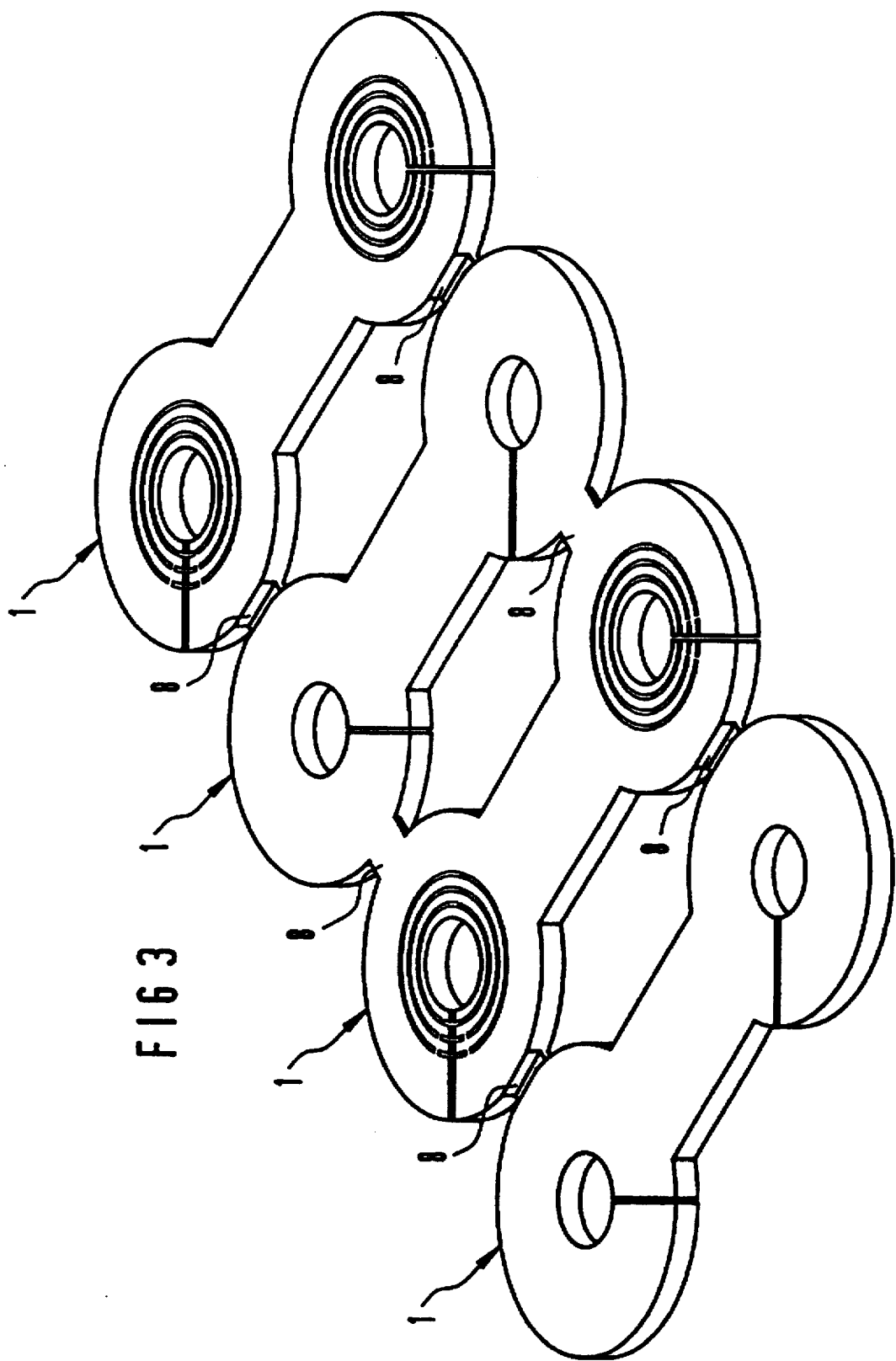

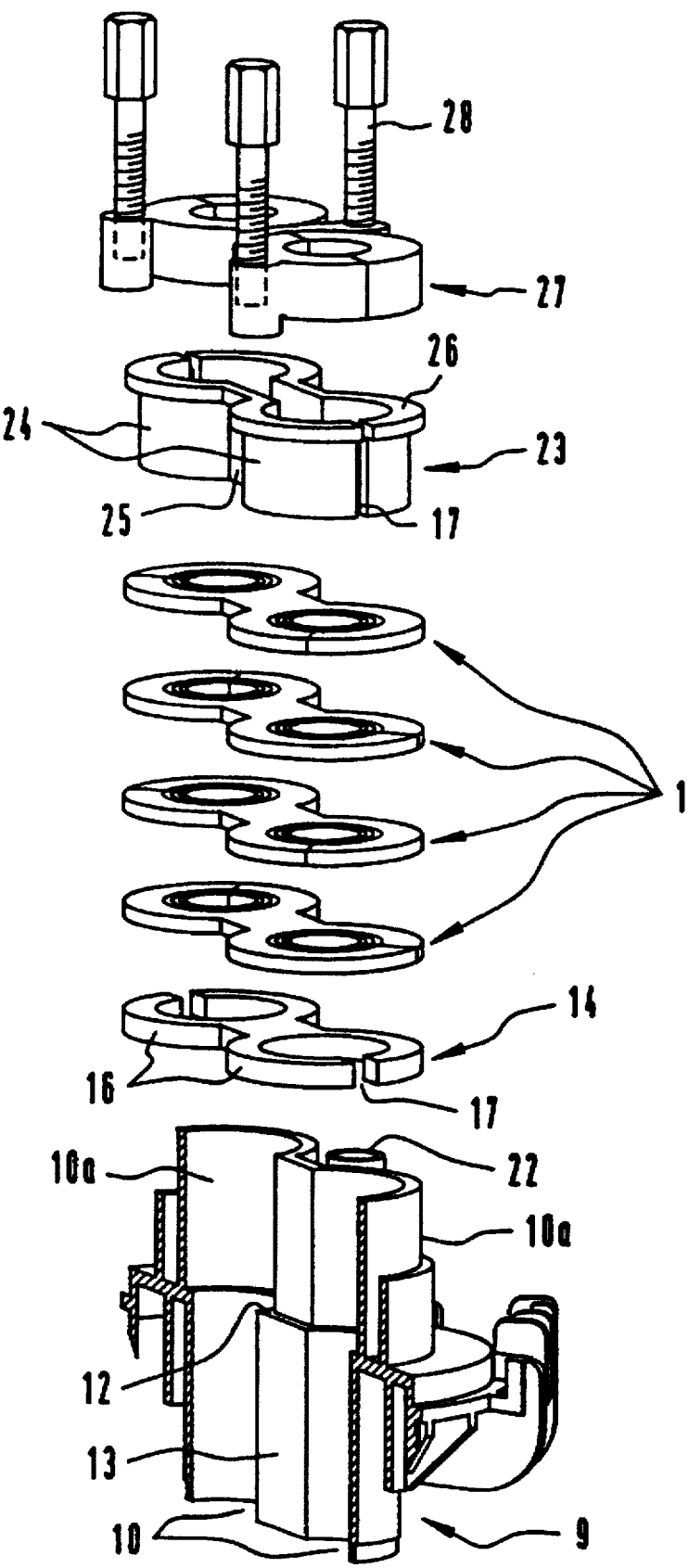

SEAL INSERT FOR CABLE CONNECTIONS

BACKGROUND OF THE INVENTION

1. Field of the Invention

The invention relates to seal inserts for sealing cable connections.

2. Description of the Prior Art

EP 0 440 903-A1 discloses a seal element for sealing the opening of a cable connection in which concentric removable sealing rings are stamped in the wall of the cable connector. These sealing rings vary in size according to the diameter of the cable to be sealed. Moreover, a radial slot is made in the area of introduction, so that the seal element can be used with uncut cables.

However, the seal element disclosed in EP 0 440 903-A1 suffers from two primary deficiencies. First, it has been found that the seal has a tendency to split or form radial channels after the seals have been installed around the cable. The radial channels that form in the seal, of course, lead to unwanted leakage. Further, it has also been found that leakage can occur along the radial slots that are provided for the insertion of uncut cable.

Accordingly, there is a need for an improved cable connection sealing element that provides an improved seal with a lower possibility of leakage than that disclosed in EP 0 440 903-A1 and other similar sealing elements taught by the prior art.

SUMMARY OF THE INVENTION

The present invention provides an improved seal insert that can be fitted over the diameter of the respective cable to be connected and that can also be used with uncut cables, whereby the sealing relationships in the areas of the stampings of the concentric rings and of the radial slots are improved. This object is inventively solved by means of a seal insert of the type explained above, in that several sealing disks provided with concentric ring stampings running concentrically about the connection opening on one side of each disk. The disks are arranged reciprocally over one another in the connection opening of the cable sleeve so that the concentric rings of one disk engages a smooth underside 4 of an adjacent disk for an improved seal. The sealing disks are also deformable by means of pressure elements in such a way that they can be pressed so as to form a seal against the wall of the opening of the cable sleeve and against the connected cable.

The sealing system according to the invention consists of elastic disk seals, preferably made of silicon or other suitable materials. The seals are equally suited both for seals in single connections and for introductions of several cables as well as connections for uncut cables. For the specification of the invention, a seal insert for sealing with the connection of an uncut cable is taken as an example, since the relations are simpler for single connections, as is shown later. For sealing with the connection of uncut cables, it must already be provided in the area of connection of the cable sleeve that the uncut cable can be introduced through the connection area without difficulty. This is solved in a known way in that two cable connection openings are connected with one another via a common connecting slit or cut, through which the loop of the uncut cable can be led to the central opening in the seal. Thus, for the sealing, the seal has to be carried out not only in the cable connection openings themselves, but also in the connecting slit. This is brought about by means of seals consisting of two annular sealing disks, connected with one another via a common connecting segment, so that the seal insert extends over both cable connection openings and over the common connecting slit. However, in order to be able to introduce uncut cable through the seal inserts as well, radial slits or cuts must be made in the two annular sealing disks so that they can be guided over the cable or so that the cable can be guided through the slots. Moreover, for fitting purposes, concentric fitting stampings are provided around the introduction opening. By providing the concentric stampings, the radial channels do not form along these fitting stampings and along the radial cuts as they do with prior art structures. Any such radial channels can lead to a lack of a tight seal. The advantage of the present invention lies in the removal of this risk.

The inventive seal ensues by means of a seal packet formed from several sealing disks arranged over one another, whereby these sealing disks are set over one another, first, reciprocally, and, second, with mutually displaced radial slits. In addition, the concentric fitting stampings in the areas of the radial slits are respectively overlapped with solid or unslotted radial segments so that there are no continuous radial channels formed by overlapping slits. The individual sealing disks are usefully already connected with one another reciprocally by means of film hinges, so that during the folding together of the sealing disks to form the seal packet, the alternating arrangement already necessarily results, whereby a non-overlapping displacement of the radial slits lying over one another is also achieved. Also, in this way no continuous radial slit forms over the entire seal packet. In this seal packet, a flat surface thus always lies opposite a stamped surface, and irregularities in the intermediate layers can hardly form during the pressing of the seal packet by means of the pressure elements.

BRIEF DESCRIPTION OF THE DRAWINGS

The invention is explained in more detail by means of an exemplary embodiment for a double introduction of an uncut cable, on the basis of five figures.

FIG. 1 is a perspective view of an individual double seal of the present invention made of two sealing disks connected with one another in one plane by means of a connecting segment.

FIG. 2 is a sectional view taken substantially along line II—II of FIG. 1.

FIG. 3 is a perspective view of a seal packet of the present invention, folded open.

FIG. 4 is an exploded view of a cable connection seal of one embodiment of the present invention.

Figure 5:
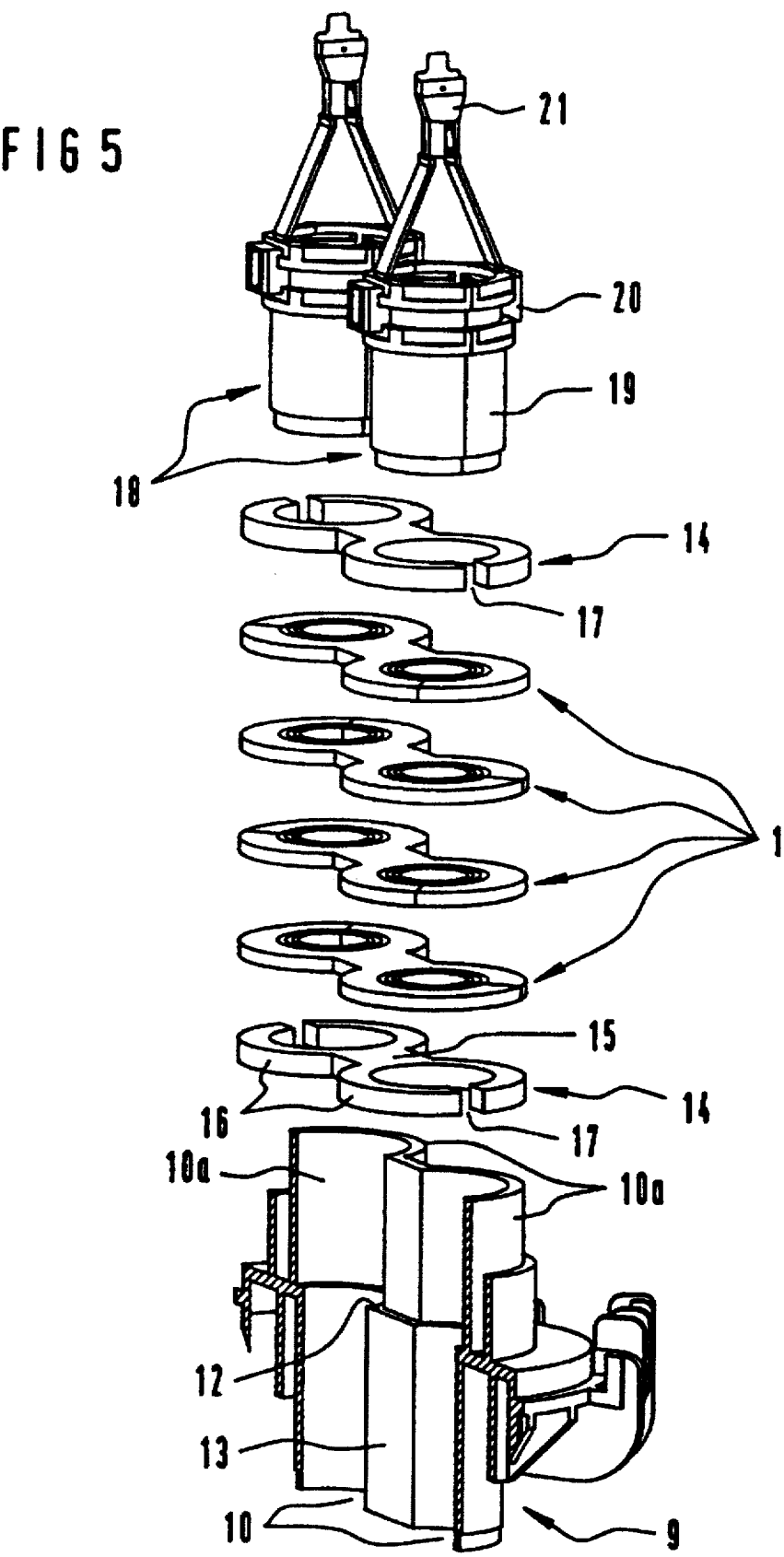
FIG. 5 is an exploded view of a cable connection seal of a second embodiment of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DESCRIPTION OF THE PREFERRED EMBODIMENTS

Like figures will be used to refer to like or similar parts in the following description of the preferred embodiments.

FIG. 1 shows a double seal 1, in which in principle two individual sealing disks 2 are connected with one another via a common seal segment 3. A double seal 1 of this sort is used in a doubled cable connection opening for an uncut cable, formed by two cylindrical cable introduction openings and a connection slot lying between them. In principle, the inventive seal system can however also be used for single introductions, whereby then only one of the sealing disks 2, whose completion is shown in the figure by dotted lines, are installed over one another in the cable connection openings of the cable sleeve. However, in the following discussion, only the double seals 1 are specified.

The double seal 1, made of the two sealing disks 2 that are connected via the common connecting segment 3, has several fitting stampings 6 running concentrically around each introduction opening 4. The stampings or grooves 6 are not made through the entire thickness of the sealing disks, so that a thin area of seal material remains between the grooves and the underside of the seal. As needed, corresponding rings are removed for fitting around larger cable diameters, so that in this way a series of cable diameters can be accommodated with a single design. While this concept alone is not new in principle, however, up to now, only simple seals were used in which during the pressing of the fitting stampings, small channels could form resulting in a faulty seal. In the present invention, several such sealing disks 2, which can be correspondingly thinner, are reciprocally arranged over one another, in such a way that a profiled surface shown in FIG. 1 is respectively followed by a smooth surface. During the pressing of the sealing disks 2 by the pressure elements, a uniform and compensating conforming of the surfaces lying opposite one another then ensues, so that channels can no longer form.

Moreover, the radial slits 5 can be seen, which make it possible for uncut cable to be introduced into the connection openings 4 as well. These radial slits 5 must however be continuous, and in a single seal, channels would also arise here again. However, this is prevented according to the invention in that the radial slits 5 of the sealing disks 2 lying over one another are mutually displaced, so that the individual radial slits 5 do not overlap over one another. In this way, a continuous radial slit or channel is avoided. In the area of these radial slits 5, the concentric fitting stampings are also interrupted by radially running segments 7, so that here as well no continuous connecting channels can arise.

FIG. 2 illustrates the section indicated at II—II in FIG. 1, in which primarily the constructions of the fitting stampings 6 are illustrated. As explained above, the fitting stampings 6 are not continuous, so that thin remaining walls are obtained, and a sealing end is ensured. However, the thin remaining wall respectively enables a simple removal of the individual rings, for fitting to the respective cable diameter.

As illustrated in FIG. 3, several individual double seals 1 are combined into a unit from two sealing disks 2 that are respectively connected via the connecting segment 8, in such a way that upon the folding together of these double seals 1, the correct stacking seals over one another necessarily arises. For this purpose, film hinges 8 are arranged so that respectively a profiled surface of a double seal 1, which surface is provided with fitting stampings or grooves 6, comes together with a smooth surface of the next following double seal 1. Moreover, it follows therefrom that upon this folding together to form a seal packet, the radial slits 5 of the double seals 1 that lie over one another do not come into contact with one another. Thus, in this area no continuous cut, slot, channel or slit arises.

By means of separation along the film hinges 8, it is also possible to remove double seals 1 to form a thinner packet, or, it is possible to add double seals 1 to form a thicker packet.

As illustrated in FIG. 4, the assembly of a doubled cable introduction of a cable sleeve 9 is demonstrated. The sleeve head of the cable sleeve 9 contains two cable connection openings 10 that are connected with one another via a common open connecting hinge 13. In this way, it is possible to introduce uncut cable in a curved form. Within these introduction openings 10 and the connection hinge 13, a circumferential gradation 12 is provided that serves for the support of the seal packet or, respectively, the pressure distribution element 14. In the outer areas 10a of the cable connection openings 10, the sealing insert is then set from the double seals 1 between the pressure distribution elements 14 and 23. In the exemplary embodiment illustrated in FIG. 4, a pressure plate 27 is provided as a pressure element, which is pressed as an end on the seal insert, by means of pressure screws 28 that engage in threaded sleeves 22 on the sleeve head. For the sealing of the cable connection openings, a first inner pressure distribution element 14 is inserted, which is made of two support rings 16 connected with one another by a segment. These support rings 16 likewise have radial slits or cuts 17 for the introduction of uncut cable. On the pressure distribution element 14, the double seals 1 are placed one on another in the way already described and illustrated in FIG. 4. The end is formed by the outer pressure distribution element 23, which is likewise again provided with radial slits 17 in the support rings 24. These individual rings 24 are also connected with one another via a common element 25 to form a unit. On the upper edge of the pressure distribution element 23, a circumferential edge is provided as a stop 26, by means of which a pressure limit is given during the pressing on by means of the pressure plate 27.

The exemplary embodiment according to FIG. 5 differs from the version shown in FIG. 4 only in that the pressure elements 18 are formed by cylindrical sheaths that respectively comprise an outer threading, with which they are screwed into inner threadings 11 of the cable connection openings 10a in a pressing manner. The outer pressure distribution elements 14 have no stops, since they are likewise pressed into the cable introduction openings by the pressure elements 18. A corresponding stop could be provided on the pressure elements 18. As a special feature, it is also shown here that the pressure elements 18 can be provided with cable clamp devices 20, which press directly on the cable sheath of the introduced cable, thus securing the introduced cable against stress from pressure, tension and torsion. In addition, a fixing device 21 for a central element of an optical cable is respectively arranged on the pressure elements 18. These ends are thereby also suited for the introduction of optical cable.

The sealing disks 2 or, respectively, the double seals 1 are preferably made of an elastic material such as e.g. silicon. However, in various applications, it is useful to manufacture the sealing disks 2 or, respectively, the double seals at least partly from a plastic material. For this purpose, a plastic/elastic butyl mixture is suitable, for example. A plastic/elastic butyl mixture is a mixture that exhibits both elastic and plastic properties. The sealing effect can be additionally improved if at least the individual sealing disks 2 or, respectively, the double seals 1 are made of elastic material and are coated with plastic sealing material or a sealing paste, as known in cable accessory technology.

Although modifications and changes may be suggested by those skilled in the art, it is the intention of the inventors to include within the patent warranted hereon all changes and modifications as reasonably and properly come within the scope of their contribution to the art.

What is claimed is:

1. A seal insert for providing a seal between a cable sleeve and cable connecting apparatus, the insert comprising:

a plurality of annular, flat, two-sided sealing disks, each of said disks including a central opening for accommodating the cable, a plurality of spaced concentric grooves disposed on a first side of the disks between the opening and an outer periphery thereof, a second side of the disks having a smooth surface, the disks being stacked together so that the first side of each disk engages either a smooth side of an adjacent disk or the cable connecting apparatus, each of said disks further comprising a radially extending slit for permitting the passage of uncut cable therethrough to the central opening, the disks being stacked together so that a radially extending slit of one disk is not in alignment with a radially extending slit of an adjacent disk, and each of said disks further comprising a pair of solid radially extending segments that interrupts each of the concentric grooves, said segments being disposed on opposing sides of said slits, wherein the each of said sealing disks is connected to another of said sealing disk to form connected pairs of said sealing disks, and wherein each of said pairs of sealing disks are connected to another of said pairs of sealing disks by a film hinge to form connected pairs of said sealing disks.

2. The seal insert of claim 1 further comprising two pressure distribution elements, the disks being stacked between the pressure distribution elements, the pressure distribution elements comprising a ring structure with a central opening for accommodating the cable.

3. The seal insert of claim 2 further comprising two clamp elements, the pressure distribution elements and stacked disks being disposed between the clamp elements.

4. The seal insert of claim 3 wherein at least one pressure distribution element includes a stop for engaging the cable connecting apparatus thereby limiting the force imposed by the clamp elements.

5. The seal insert of claim 2 wherein the pressure distribution elements further comprise a radial extending slit for permitting the passage of uncut cable therethrough to the central opening.

6. The seal insert of claim 1 wherein the disks are fabricated from silicon.

7. The seal insert of claim 1 wherein the disks are fabricated from a plastic/elastic butyl mixture.

8. The seal insert of claim 1 wherein the disks are coated with a plastic sealing material.

9. A sealable cable connection comprising:

a pressure plate including at least one central opening for accommodating a cable, the pressure plate engaging a first pressure distribution ring including at least one central opening for accommodating the cable, the first pressure distribution ring being disposed between the pressure plate and a plurality of annular, flat, two-sided sealing disks, each of said disks including a central opening for accommodating the cable, a plurality of spaced concentric grooves disposed between the opening and an outer periphery of a first side of the disks, a second side of the disks having a smooth surface, the disks being stacked together so that the first side of each disk engages either a smooth side of an adjacent disk or the cable connecting apparatus, the disks being disposed between the first pressure distribution ring and a second pressure distribution ring including at least one central opening for accommodating the cable, the second pressure distribution ring being disposed between the disks and a sleeve head including at least one central opening for accommodating the cable, the pressure plate being connected to the sleeve head, the pressure plate is connected to the sleeve head with at least one threaded bolt whereby the pressure between the pressure plate and the sleeve head may be adjusted by tightening or loosening the bolt, each of said disks further comprising a radially extending slit for permitting the passage of uncut cable therethrough to the central opening, the disks being stacked together so that a radially extending slit of one disk is not in alignment with a radially extending disk of an adjacent disk, each of said disks further comprising a pair of solid radially extending segment that interrupts each of the concentric grooves, the segments of a respective disk being disposed on opposing sides of the slit of said disk, the pressure plate, first and second pressure distribution plates, disks and sleeve head including at least two central openings for accommodating two cables.

10. The sealable cable connection of claim 9 wherein the pressure distribution rings further comprise a radial extending slit for permitting the passage of uncut cable therethrough to the central opening.

* * * * *